United States Patent Office 3,717,890
Patented Feb. 27, 1973

3,717,890
TRANSFER MECHANISM FOR MULTISTAGE MACHINE TOOLS
Alois Weller, Dusseldorf, Germany, assignor to Malmedie & Co. Maschinenfabrik GmbH, Dusseldorf, Germany
Filed Nov. 5, 1971, Ser. No. 196,137
Claims priority, application Germany, Nov. 7, 1970, P 20 54 820.3
Int. Cl. B21k 1/44, 1/58, 1/64
U.S. Cl. 10—12 T                                  10 Claims

ABSTRACT OF THE DISCLOSURE

A multistage press for the production of metallic nuts, bolts or the like has a die breast with a horizontal row of work stations and a carriage which is reciprocable along the die breast through distances corresponding to that between two neighboring work stations. The frame of the press supports a gear segment and a coaxial cam for each work station. A transfer device of a first type can be attached to the carriage for each work station or for one or more selected work stations, and such transfer device employs a shaft which carries a follower tracking one of the cams, a gear meshing with one of the gear segments, and a pair of elastic fingers which can transport and simultaneously invert a blank during movement of the carriage with reference to the die breast. A transfer device of a second type can be attached to the carriage for each work station or for one or more selected work stations in addition to or as a substitute for a transfer device of the first type. Each transfer device of the second type has a pair of jaws which can be moved between open and closed positions by a rotary cam provided in the machine frame. The gear and the follower on the shaft of each transfer device of the first type can be replaced by a retainer which holds the shaft against rotation and also prevents the shaft from pivoting about an axis which is parallel to its own axis when the carriage moves with reference to the die breast.

BACKGROUND OF THE INVENTION

The present invention relates to machine tools in general, and more particularly to improvements in multistage presses for the mass-production of metallic nuts, bolts and/or analogous relatively small articles which are obtained by appropriate treatment of blanks at a plurality of work stations. Still more particularly, the invention relates to improvements in transfer mechanisms which are utilized to transport untreated or partially finished blanks between successive work stations of a multistage press.

The construction of transfer devices which are employed in the transfer mechanisms of multistage presses depends on the nature of blanks which are to be transported between successive work stations in a die breast which forms part of the press. If the cross-sectional outline of a blank is constant from the one to the other end thereof, or if the cross-sectional outline of the blank varies negligibly from end to end, a transfer device for such blanks may comprise two resilient fingers which are forced apart by the blank and thereupon grip the blank during transport from a preceding work station to the next-following work station. If the transfer device is to transport relatively complicated blanks, it must be provided with jaws or claws which are movable between open and closed positions. Thus, the jaws are caused to open before an ejector or knock out device expels a blank from a work station and are thereupon caused to close and to automatically grip the workpiece therebetween.

It is often necessary to effect a turnover or inversion of blanks during transport between at least two neighboring work stations. Pat. No. 2,648,077 to Friedman discloses a transfer mechanism with eccentrically mounted tongs which are capable of inverting a blank during movement of the carriage between two end positions. A drawback of such transfer mechanisms is that the tongs are not sufficiently versatile, i.e., that they can be used only when a blank must be inverted during transport from a preceding work station to the next following work station.

Pat. No. 3,217,343 to Barkocy discloses a transfer mechanism wherein first holders are fixedly secured to the carriage. Each first holder supports a rotary sleeve having a V-shaped slot for reception of a blank which is supported by a second holder. The second holders and the sleeves are biased against the respective first holders and the sleeves carry gears which are rotatable by a rock on the frame of the multistage machine. A drawback of such proopsal is that each blank is compelled to change its angular position during movement of the carriage as well as that the slots of the sleeves are incapable of properly holding and transporting relatively long workpieces. Moreover, neither of the aforedescribed machines have any means for effecting controlled movements of pairs of cooperating blank-engaging jaws between open and closed positions so that the number of article types which can be treated in such machines is rather limited.

German Pat. No. 964,460 discloses a multistage press wherein the carraige for transfer devices is pivotable about an axis which is parallel to the direction of lengthwise movement of the carraige. This enables the tongs on the carriage to bypass the work stations while the tongs perform an angular movement in order to invert the blanks. Gears on the tongs mesh with a rack which is mounted in the frame of the press. There is no provision to open and close the jaws of the tongs during certain stages of movement or during the periods of idleness of the carriage.

Pat. No. 3,022,526 to Davis discloses a transfer mechanism wherein the transfer devices for blanks have fingers or jaws which invariably assume predetermined positions with reference to each other. The transfer devices are movable along the work stations with or without simultaneous turnover of articles. The transfer mechanism of this patent is quite complex because the holders for the fingers must perform a very complicated movement whenever the carriage moves with reference to the die breast.

Patent No. 2,687,660 to Friedman discloses an apparatus for forming blanks wherein a carriage reciprocates between two end positions and supports several transfer devices with tongs which can be moved between open and closed positions while the carriage moves with reference to the frame. A drawback of such proposal is that the tongs cannot be used for inversion or turnover of blanks.

SUMMARY OF THE INVENTION

An object of the invention is to provide a multistage machine tool, particularly a multistage press for the mass-production of metallic nuts, bolts or analogous articles, with a novel and improved transfer mechanism which is more versatile than presently known transfer mechanisms, which can be used to effect mere translatory or more complex movements of blanks during transport between successive work stations, wherein the nature of transport can be varied with little loss in time, wherein all of the blanks need not be moved in the same way, and which can be used for satisfactory transport of a wide variety of differently configurated and/or dimensioned articles.

Another object of the invention is to provide the transfer mechanism of a multistage press for nuts, bolts or like articles with novel and improved transfer devices which can but need not effect a turnover of blanks during transport between selected work stations and which can be rapidly attached to, detached from or rearranged on the carriage which moves them with reference to the work stations, and whose carriage can be installed in many presently known types of multistage presses to serve as a superior and more versatile substitute for the carriages of presently known transfer mechanisms.

A further object of the invention is to provide a transfer mechanism wherein the transfer devices which can effect identical or different movements of blanks during transport between successive work stations can be regrouped with little loss in time, by resorting to simple and readily available tools, and by employing semiskilled or even unskilled workmen.

The invention is embodied in a multistage press or an analogous machine for the mass-production of bolts, nuts and/or similar articles. The machine comprises a frame, a die breast installed in the frame and providing a preferably horizontal row of equidistant work stations for the reception of metallic blanks, a carriage which is mounted in the frame for reciprocatory movement in parallelism with the row of work stations between two spaced end positions, a plurality of equidistant cams and first gears (e.g., gear segments) provided on the frame, one for each work station, a plurality of equidistant first and second receiving or coupling means (e.g., tapped bores) provided in or on the carriage, one for each work station, at least one first transfer device having a holder, a bearing member pivotably mounted in the holder, a shaft rotatably mounted in the bearing member and having resilient blank gripping means at one end, a second gear (e.g., a pinion) on the shaft, and a follower on the shaft, first fastener means or analogous complementary coupling means cooperating with one of the first receiving or coupling means to secure the holder of the first transfer device to the carriage whereby the pinion and the follower on the shaft of the transfer device respectively mesh with and track one of the first gears and one of the cams on the carriage, and biasing means for maintaining the pinion in mesh with the one first gear and for simultaneously urging the follower against the one cam whereby the pinion cooperates with the one first gear to rotate the shaft of the first transfer device in the bearing member and the follower cooperates with the one cam to pivot the bearing member with reference to the holder in response to movement of the carriage with reference to the frame. The gripping means of the shaft is moved from register with one of the work stations into register with a neighboring work station in response to movement of the carriage from the one to the other end position, and such gripping means simultaneously turned through 180 degrees.

The pinion and the cam on the shaft of the first transfer device can be replaced with a retainer which can be coupled to the biasing means to hold the shaft against rotation about its own axis and to hold the bearing member against pivotal movement with reference to the holder when the carriage is caused to move with reference to the die breast. The retainer will be utilized when a blank which is being transported by the gripping means need not or should not be inverted during transport between two neighboring work stations.

The machine further comprises at least one second transfer device which can be used interchangeably with as well as in addition to the first transfer device and comprises a second holder and a pair of jaws mounted in the second holder for movement between open and closed positions. The second holder can be attached to a selected second coupling or receiving means of the carriage and the machine further comprises means for moving the jaws of a properly attached second transfer device with reference to each other at predetermined intervals. The jaws register with one work station in the one end position of the carriage and with a neighboring work station in the other end position of the carriage.

The novel features which are considered as characteristic of the invention are set forth in particular in the appended claims. The improved machine tool iteslf, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
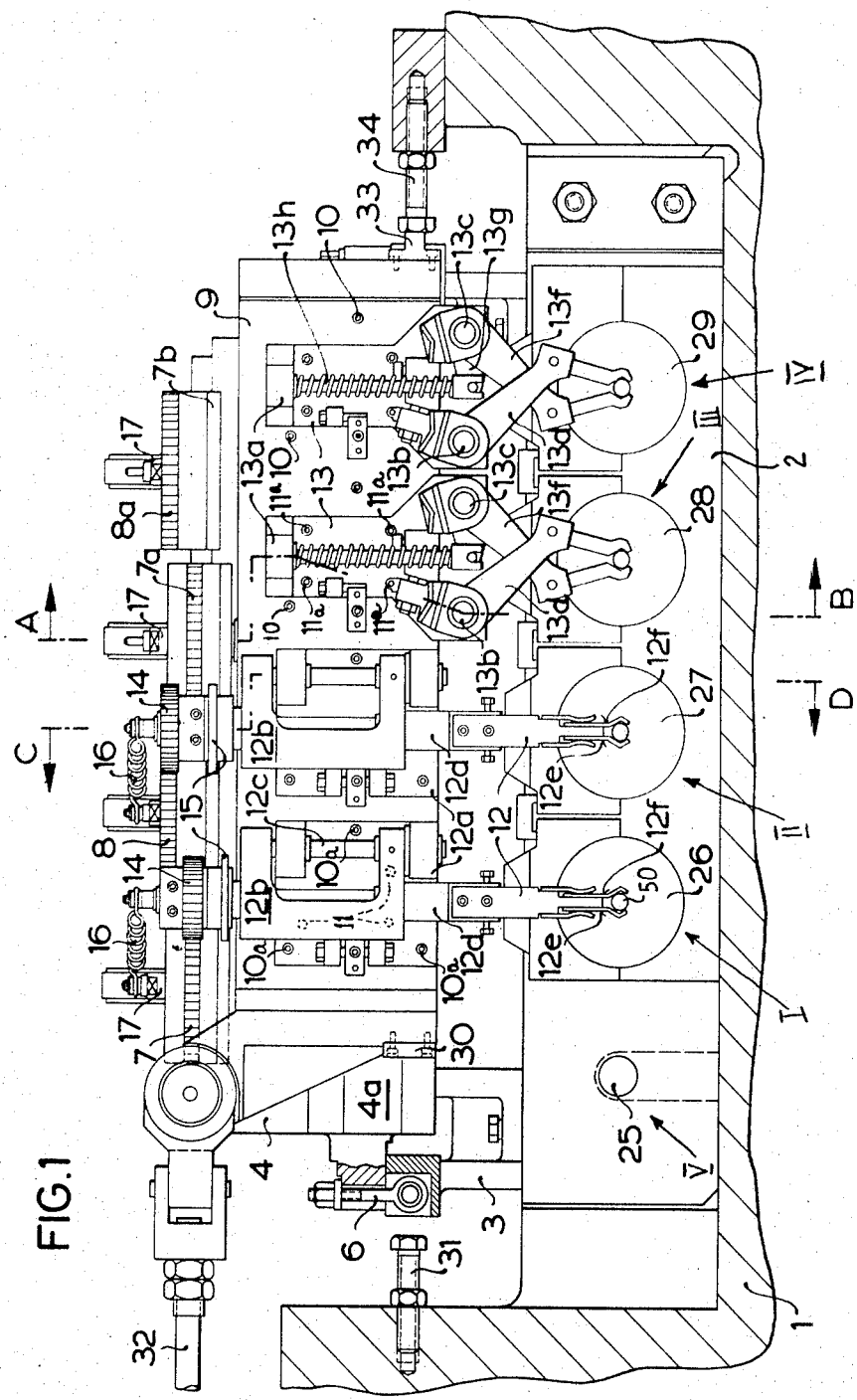
FIG. 1 is a front elevational view of a multistage press having a transfer mechanism which embodies one form of the invention, with the frame shown in vertical section.
Figure 2:
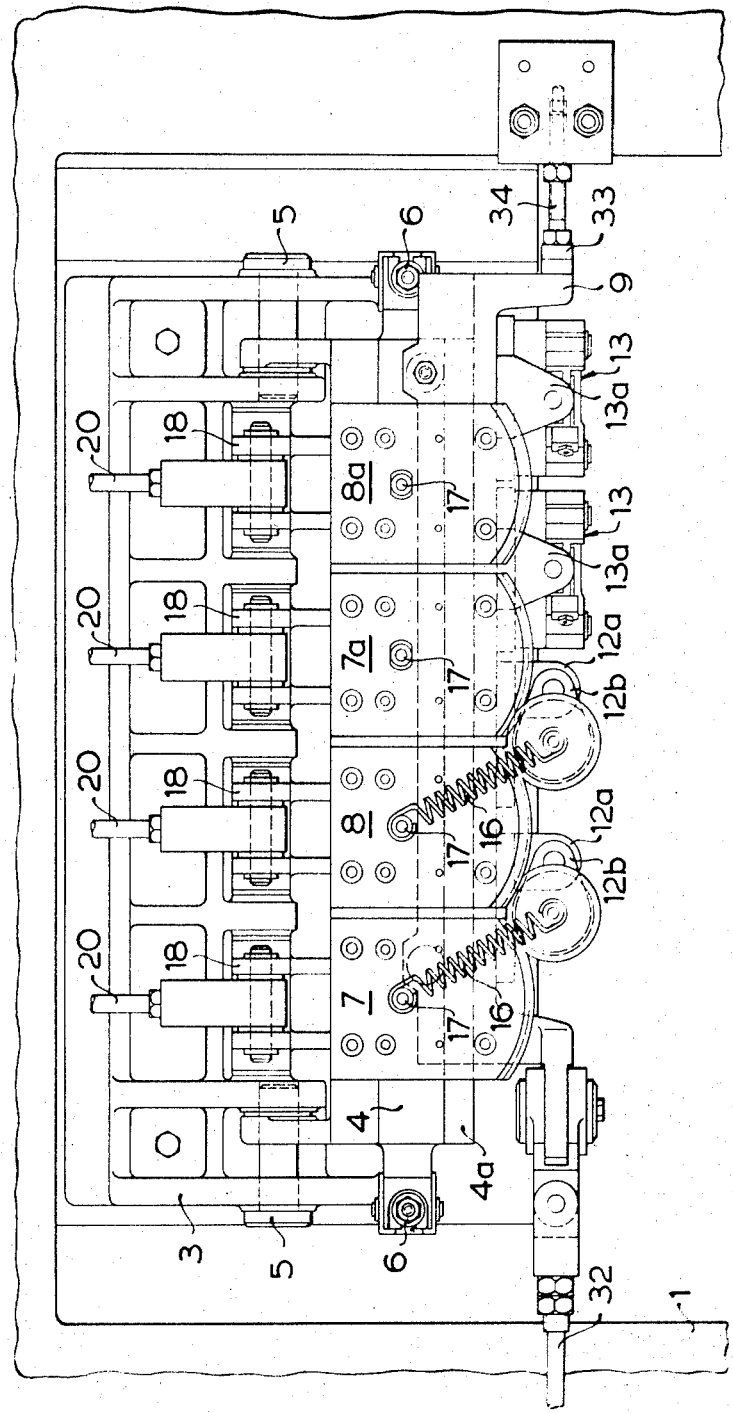
FIG. 2 is a plan view of the structure shown in FIG. 1.

Referring first to FIGS. 1 to 5, there is shown a machine tool in the form of a multistage press which comprises a frame 1 supporting a die block or die breast 2 at a level below a support 3 for an elongated guide or rail 4 which is pivotable about a horizontal axis defined by two pivot members 5 and can be fixed in a selected angular position by eye bolts 6. The guide 4 can be said to form part of the frame 1 and is rigidly connected with and supports four first gears here shown as gear segments 7, 7a, 8 and 8a. The segments 8, 8a are located at a level above and alternate with the segments 7, 7a (see particularly FIG. 1). Each of the segments 7, 7a, 8, 8a is located at a level above a discrete cam 7b. In the embodiment of FIGS. 1 to 5, the gear segments 7, 8 mesh with two discrete second gears or pinions 14 and the cams 7b which are associated with the segments 7, 8 are tracked by two discrete roller followers 15. Each of these roller followers is coaxial with one of the second gears or pinions 14. The arrangement is such that the left-hand pinion 14 of FIG. 1 cannot mesh with the gear segment 8, that the right-hand pinion 14 of FIG. 1 cannot mesh with the gear segment 7, and that each of the two roller followers 15 can track only one of the cams 7b, namely, the left-hand follower 15 can track only by leftmost cam 7b and the right-hand follower 15 can track only the cam 7b below the gear segment 8.

The guide 4 carries at its front side a plate 4a which serves to directly guide a horizontally reciprocable carriage 9 which is movable back and forth between two preselected end positions by a mechanism including an articulately connected motion transmitting rod 32. The die breast 2 supports a horizontal row of four equidistant dies 26, 27, 28, 29 each of which can be used to subject a workpiece or blank to a different treatment. The four work stations at which the dies 26, 27, 28, 29 are located are respectively denoted by the characters I, II, III and IV (see FIG. 1). It is to be noted that the number of work stations may be less than or that it may exceed four.

The carriage 9 is provided with first and second receiving or coupling means in the form of tapped bores 10 and 11, there being one set of bores 10 and 11 for each of the four work stations I to IV. The bores 10 serve for reception of complementary coupling members such as bolts, screws or analogous fasteners 10a for holders 12a which form part of a first type of transfer devices 12, and the bores 11 are designed to receive fasteners 11a for attachment to the carriage 9 of holders 13a of a second type of transfer devices 13. Each transfer device 12 further comprises two resilient article-engaging or article gripping fingers 12e, 12f and each transfer device 13 further comprises two rigid article-engaging or article gripping jaws or claws 13d, 13f. It will be noted that the holders 12a and 13a are interchangeable, i.e., that the space occupied by a holder 12a can be occupied by a holder 13a or vice versa, depending on the nature of articles which are to be transported to the first station I, between the stations I to IV, and from the station IV. FIG. 1 shows that the carriage 9 supports two transfer devices 12 one of which serves to transfer articles to the first station I and the other of which serves to transfer articles from the station I to the station II, and two transfer devices 13 one of which serves to transfer articles from the station II to the station III and the other of which serves to transfer articles from the station III to the station IV.

Each transfer device 12 further comprises a bearing member or yoke 12b which is turnable on a pintle 12c of the respective holder 12a and supports an upright shaft 12d the lower end portion of which carries the aforementioned resilient fingers 12e, 12f and the upper end portion of which carries one of the second gears or pinions 14 and the associated roller follower 15. The fingers 12e, 12f are screwed or otherwise separably secured to the lower end portions of the respective shafts 12d. Each shaft 12d has a projection extending upwardly beyond the respective pinion 14 and serving as a post for one end of a helical spring 16 the other end of which is attached to a post 17 on the guide 4. The extension of each shaft 12d preferably carries a rotatable sleeve which is engaged by the respective end of the corresponding spring 16. The purpose of the springs 16 is to bias the pinions 14 against the respective gear segments 7, 8 and to simultaneously bias the roller followers 15 against the corresponding cams 7b. Thus, the teeth of the pinions 14 are compelled to remain in mesh with the respective gear segments.

Figure 3:
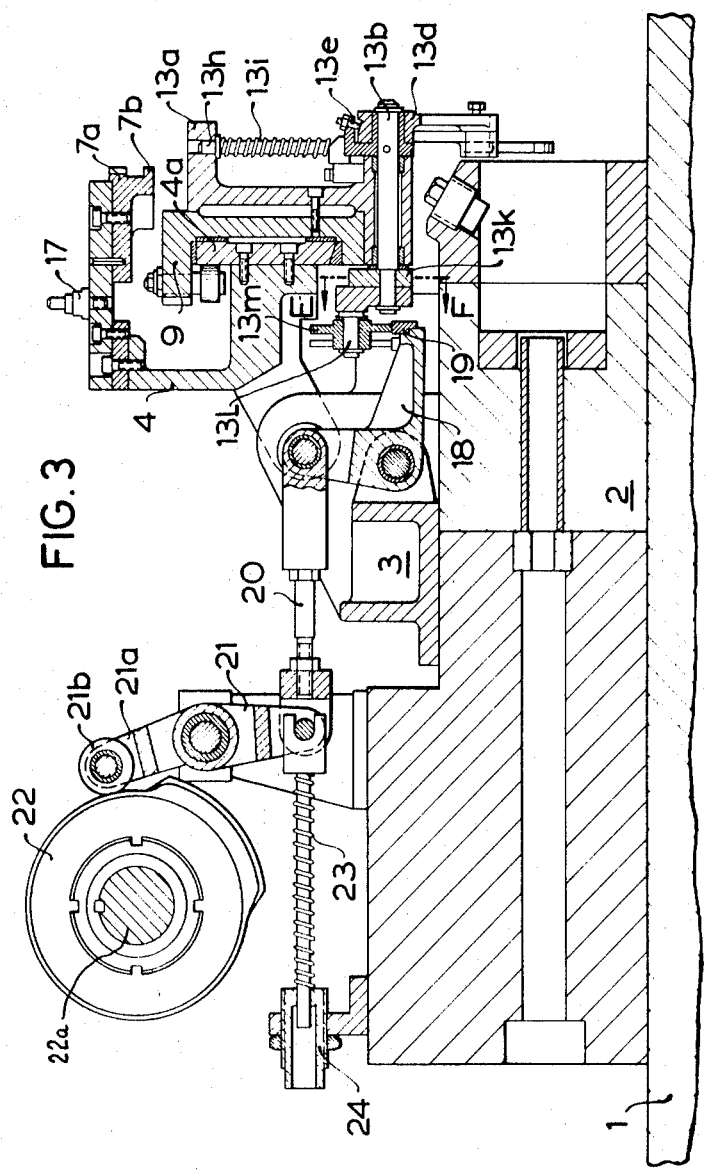
FIG. 3 is a transverse vertical sectional view as seen in the direction of arrows from the line A–B of FIG. 1.
Figure 4:
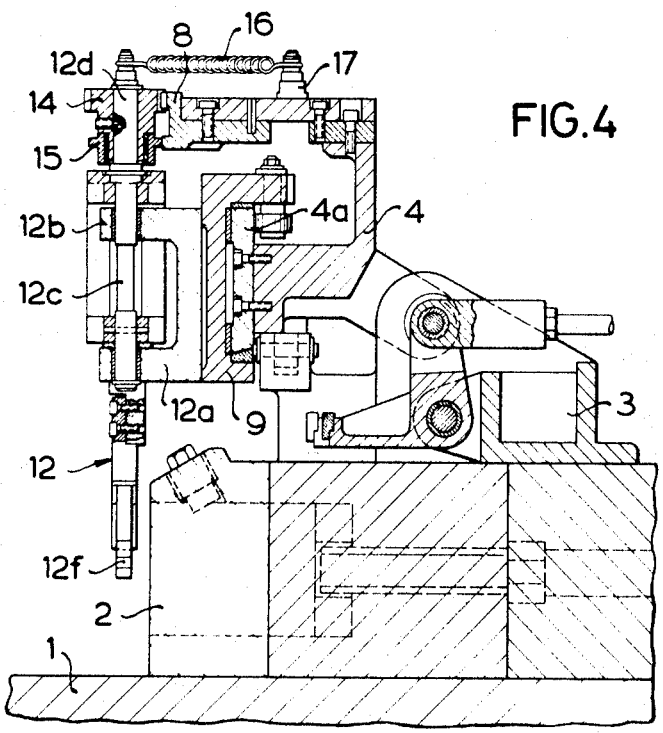
FIG. 4 is a transverse vertical sectional view as seen in the direction of arrows from the line C–D of FIG. 1.
Figure 5:
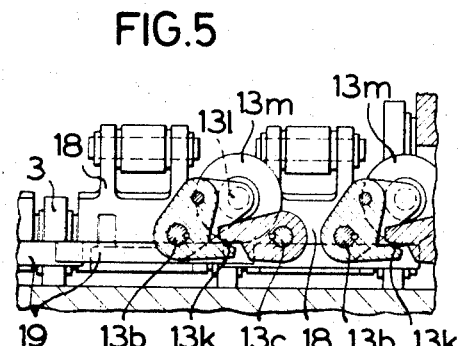
FIG. 5 is a fragmentary vertical sectional view as seen in the direction of arrows from the line E–F of FIG. 3.

Each transfer device 13 further comprises two horizontal pivot members 13b, 13c which are mounted on the respective holder 13a and serve as fulcra for the jaws 13d, 13f which are mounted in and are adjustable with reference to sleeves 13e (see FIG. 3). The jaws 13d, 13f form part of two arms which cross each other at a level below the respective holder 13a as best shown in FIG. 1. By pivoting such arms about the respective pivot members 13b, 13c, the jaws 13d, 13f can be moved toward or away from each other to respectively grip or release an article. The arms for the jaws 13d, 13f are fixed to and are rotatable with the respective sleeves 13e. These sleeves have extensions 13g provided with pins each of which extends into the bifurcated lower end portion of a motion transmitting rod 13h which is surrounded and biased by a helical spring 13i. The rear end portions of the pivot members 13b, 13c are connected with component parts of pivoting devices 13k best shown in FIG. 5. These pivoting devices 13k can cooperate with the helical springs 13i to move the jaws 13d, 13f of the respective transfer devices 13 toward each other and to thereby grip an article (e.g., a partly or completely finished bolt, nut, washer or the like) therebetween. One of the two disks in each pivoting device 13k has an eccentric pin or stud 13L which rotatably supports a roller 13m. The spring 13i biases the respective roller 13m against an elongated ruler-shaped cam 19 which is mounted on one arm of a bell crank lever 18. The other arm of the bell crank lever 18 is coupled to one arm of a two-armed intermediate lever 21 by an adjustable linkage 20 and the other arm 21a of the intermediate lever 21 carries a roller follower 21b which tracks the face of a disk-shaped cam 22 provided on a camshaft 22a. The roller follower 21b is biased against the periphery of the cam 22 by a helical spring 23 which bears against the lower arm of the intermediate lever 21 and reacts against an adjustable retainer 24 on the frame 1 behind the die block 2. The press comprises four cams 22 (see the four bell cranks 18 and the four linkages 20 of FIG. 2) so that the jaws 13d, 13f of as many as four discrete transfer devices 13 can be moved relative to each other by discrete cams 22, always in such a way that the articles at the respective work stations can be grasped and/or released by the respective transfer devices 13 at predetermined intervals. It will further be noted that the press comprises four posts 17 so that it may be equipped with as many as four transfer devices 12, one for each of the work stations I, II, III, IV. The length of each ruler 19 is selected in such a way that each roller 13m remains in engagement with (tracks) the corresponding ruler 19 during each full stroke of the carriage 9 between its two end positions. An observation of FIG. 2 will reveal that each but the station IV is disposed substantially midway between two neighboring cams 22 (see the positions of the linkages 20 shown in FIG. 2).

The operation:

The longitudinal ends of the carriage 9 are provided with bumpers 30, 33 which can be moved into abutment with adjustable stops 31, 34 provided in the frame 1. The adjustment of the stops 31, 34 determines the length of strokes which the carriage 9 can perform under the action of the motion transmitting rod 32. In its starting position, the carriage 9 maintains its left-hand bumper 30 (as viewed in FIG. 1) in abutment with the stop 31. The resilient fingers 12e, 12f of the left-hand transfer device 12 are then located in front of a blank feeding or supplying station V which accommodates a plunger 25 or another suitable article feeding device serving to introduce a blank into the space between the adjacent fingers 12e, 12f while the carriage 9 dwells in its left-hand position. The right-hand transfer device 12 then registers with the die 26 at the work station I and the two transfer devices 13 register with the work stations II, III. The blank which is introduced by the plunger 25 enters between and is thereupon held by the fingers 12e, 12f of the left-hand transfer device 12 for transport to the work station I. The carriage 9 is thereupon shifted by the motion transmitting rod 32 so that the bumper 33 moves toward and ultimately abuts against the stop 34. During such translatory movement of the carriage 9, the two pinions 14 roll along the respective gear segments 7, 8 and the roller followers 15 track the respective cams 7b so that the shafts 12d of the transfer devices 12 rotate about their respective axes whereby each pair of fingers 12e, 12f turns through 180 degrees. In other words, the blank which is received at the station V is turned around and is moved into register with the die 26 at the work station I. At the same time, the partially finished article which was received by the fingers 12e, 12f of the right-hand transfer device 12 at the work station I is turned through 180 degrees and is moved into register with the die 27 at the work station II.

The roller followers 15 cause the bearing members or yokes 12b of the two transfer devices 12 to turn about the axes of the respective pintles 12c so that each shaft 12d travels along an arcuate path whose center of curvature is located on the axis of the corresponding pintle 12c. Such movement of the yokes 12b with refernce to the pintles 12c insures that the shafts 12d can rotate the respective pairs of fingers 12e, 12f and the articles held by such fingers through 180 degrees without any interference on the part of other components of the press while the carriage 9 moves toward the end position shown in FIG. 1.

When the carriage 9 reaches the end position of FIG. 1, two male tools or rams (not shown) cause the transfer of articles from the transfer devices 12 into the respective dies 26, 27. Such male tools or rams are disclosed, for example, in Pat. No. 3,452,582 granted July 1, 1969 to Faymonville. The male tools cooperate with the respective dies 26, 27 to subject the articles at the work stations I and II to a predetermined shaping action. The male tools are thereupon withdrawn from the spaces between the fingers 12e, 12f at the work stations I, II and return to retracted positions in which they cannot interfere with movements of the carriage 9 between the stops 31 and 34. The carriage 9 is thereupon returned to its left-hand end position, as viewed in FIG. 1, while the two partly finished articles remain in the dies 26, 27. Upon completion of such leftward movement of the carriage 9, the fingers 12e, 12f of the left-hand transfer device 12 are again located in front of the plunger 25 at the station V and the fingers of the right-hand transfer device 12 are located in front of the article in the die 26 at the work station I. The plunger 25 then again performs a forward stroke to deliver a fresh blank into the space between the fingers of the left-hand transfer device 12 and an ejector 50 at the work station I expels the partly treated article into the space between the fingers 12e, 12f of the right-hand transfer device 12. At the same time, a further ejector expels a partially finished article from the die 27 and introduces such article into the space between the jaws 13d, 13f of the left-hand transfer device 13. Such jaws are then located at the work station II in front of the die 27. The carriage 9 then again performs a stroke toward the end position of FIG. 1 so that the freshly supplied blank moves into register with the die 26, that the partially finished article which was removed from the die 26 moves into register with the die 27, and that the partially finished article held by the jaws 13d, 13f of the left-hand transfer device 13 is moved into register with the die 28 at the work station III. The blanks and articles which are transported by the fingers 12e, 12f of the two transfer devices 12 are turned through 180 degrees during movement of the carriage 9 toward the position of FIG. 1 whereas the articles which are transported by the jaws 13d, 13f merely move sideways. The aforementioned male tools are thereupon caused to move toward the dies 26, 27 and cooperate therewith to deform the articles which were held by the fingers 12e, 12f. A further tool, not shown, cooperates with the die 28 to deform the article which was delivered to the work station III by the left-hand transfer device 13. The male tools and the cooperating dies can deform one or both ends of workpieces at the work stations I, II, III and IV.

Figure 6:
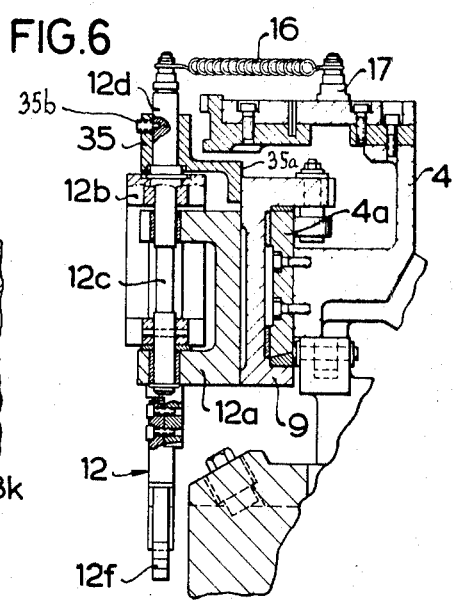
FIG. 6 illustrates a portion of the structure shown in FIG. 4 but with a first transfer device which constitutes a modification of the first transfer device shown in FIG. 4.

If the nature of treatment to which the articles must be subjected at the work station II is such that the article which was moved from the die 26 into register with the die 27 need not be inverted, the right-hand transfer device 12 of FIG. 1 is replaced with a transfer device 13. Alternatively, the right-hand transfer device 12 may remain in the illustrated position but the pinion 14 and the roller follower 15 of this device are then replaced by a retainer 35 which is shown in FIG. 6 and is connected with the respective helical spring 16 to insure that the right-hand transfer device 12 merely shares the translatory movement of the carriage 9 but that the shaft 12d of such transfer device 12 cannot rotate while its fingers 12e, 12f transport a partially finished article from the die 26 into register with the die 27 at the work station II. The retainer 35 can be non-rotatably secured to the respective shaft 12d by a screw 35b and has an extension 35a which abuts against the front side of the carriage 9.

The manner in which the transfer devices 13 transport articles between the work stations II–III and III–IV will be readily apparent upon perusal of the preceding description. The cams 22 insure that the jaws 13d, 13f open and close at predetermined intervals in synchronism with movements of the carriage 9 between its end positions, with movements of the male tools which cooperate with the dies 28, 29, and with movements of ejectors at the work stations III and IV. The ejector at the station IV can expel finished articles into a collecting receptacle, into a chute or another conveyor, not shown.

An important advantage of the improved multistage press is that the transfer devices 12 can be readily modified to insure translatory movements or translatory and simultaneous angular movements of workpieces between the stations V, I and II as well as between other groups of stations, depending on the number of transfer devices 12. The same holds true for the transfer devices 13, i.e., the press can operate with four transfer devices 12 or 13, with pairs of transfer devices 12, 13 or with three transfer devices 12 or 13 and one transfer device 13 or 12. Still further, the number of transfer devices which are used at a given time can be reduced to less than four if the nature of finished workpieces and blanks furnished at the station V is such that the treatment can be completed at one, two or three work stations. It is also clear that the distribution of transfer devices 12 and 13 may differ from the illustrated and described distributions. For example, three transfer devices 12 can be followed by a single transfer device 13, three transfer devices 13 can be followed by a single transfer device 12, the transfer devices 12 may alternate with the transfer devices 13, and so on. Such versatility of the press renders it possible to utilize it for the production of a large variety of relatively small articles, with or without a turnover of articles during transport between two or more work stations. It is equally clear that the resilient fingers 12e, 12f of the transfer devices 12 can be replaced with otherwise configurated or dimensioned fingers or analogous article-engaging or article gripping means, and that the jaws 13d, 13f of the transfer devices 13 are also replaceable by otherwise dimensioned and/or configurated article-engaging or article gripping means.

It is also within the purview of the invention to furnish the improved machine toll with two or more discrete carriages 9 each of which supports a predetermined number of transfer devices 12 and/or 13, depending on the nature of workpieces which are to be treated when a selected carriage 9 is properly mounted in the frame 1. However, the transfer mechanism which is illustrated in the drawing is preferred at this time because the cost of a machine tool with a single transfer mechanism is but a fraction of the cost of a machine tool with two or more discrete transfer mechanisms, and also because the replacement of a first transfer mechanism with a second transfer mechanism is a time-consuming operation. It was found that the versatility of the transfer mechanism which utilizes one or more transfer devices 12 and/or 13 is so great that a machine employing such transfer mechanism is capable of turning out a very large number of differently dimensioned and/or configurated articles.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. In a machine for mass-producing nuts, bolts and analogous articles, a combination comprising a frame; a die breast installed in said frame and providing a row of equidistant work stations for the reception of blanks; a carriage mounted in said frame for reciprocatory movement in parallelism with said row of work stations between two end positions; a plurality of equidistant cams and first gears provided on said frame, one for each of said work stations; a plurality of equidistant first and second coupling means provided on said carriage, one for each of said work stations; at least one first transfer device including a holder, a bearing member pivotally mounted on said holder, a shaft rotatably mounted in said bearing member and having resilient blank gripping means thereon, a second gear on said shaft, and a follower on said shaft;

first complementary coupling means cooperating with one of said first coupling means to secure said holder to said carriage whereby said second gear and said follower respectively mesh with and track one of said first gears and one of said cams; and biasing means for maintaining said second gear in mesh with said one first gear and for urging said follower against said one cam whereby said second gear cooperates with said one first gear to rotate said shaft and said follower cooperates with said one cam to pivot said bearing member with reference to said holder in response to movement of said carriage with reference to said frame, said gripping means being moved from register with one of said work stations into register with a neighboring work station and being simultaneously turned through a predetermined angle in response to movement of said carriage from the one to the other of said end positions.

2. A combination as defined in claim 1, further comprising at least one second transfer device usable interchangeably with as well as in addition to said first transfer device, said second transfer device having a second holder and a pair of jaws mounted on said second holder for movement between open and closed positions, and further comprising means for securing said second holder to a selected one of said second coupling means whereby said jaws register with one of said work stations in one end position and with a neighboring work station in the other end position of said carriage, and means for opening and closing said jaws at predetermined intervals.

3. A combination as defined in claim 2, wherein said first and second coupling means include tapped bores provided in said carriage.

4. A combination as defined in claim 2, wherein said carriage is reciprocable in an at least substantially horizontal plane and wherein said shaft of said first transfer device is held in an at least substantially vertical position when the holder of said first transfer device is secured to said carriage.

5. A combination as defined in claim 2, wherein each of said first gears is a gear segment which is coaxial with one of said cams and wherein said second gear is coaxial with said follower.

6. A combination as defined in claim 5, wherein said one gear segment is arranged to turn said shaft through 180 degrees in response to movement of said carriage between said end positions thereof.

7. A combination as defined in claim 1, wherein said second gear and said follower are separable from said shaft and further comprising a retainer connectable with said shaft in place of said second gear and said follower and being connectable with said biasing means to maintain said bearing member in a predetermined angular position with reference to said holder while said carriage moves with reference to said frame.

8. A combination as defined in claim 7, wherein said retainer comprises means for holding said shaft against rotation with reference to said bearing member.

9. A combination as defined in claim 1, further comprising means for pivotably supporting said carriage for angular movement about an axis which is parallel to said row of work stations.

10. A combination as defined in claim 1, wherein said blank gripping means comprises two elastic fingers separably secured to said shaft.

References Cited

UNITED STATES PATENTS

| | | | |
|---|---|---|---|
| 2,648,077 | 8/1953 | Friedman | 10—12 T |
| 2,687,660 | 8/1954 | Friedman | 10—76 T |
| 2,689,358 | 9/1954 | De Loe | 10—12 T |
| 2,689,361 | 9/1954 | Schaeffer et al. | 10—12 T |
| 2,728,267 | 12/1955 | Schaeffer et al. | 10—12 T |
| 2,825,075 | 3/1958 | De Loe | 10—12 T |
| 2,881,950 | 4/1959 | Friedman | 10—12 T |
| 3,022,526 | 2/1962 | Davis et al. | 10—12 T |
| 3,165,766 | 1/1965 | Wisebaker | 10—12 T |
| 3,217,343 | 11/1965 | Barkocy | 10—12 T |

CHARLES W. LANHAM, Primary Examiner

E. M. COMBS, Assistant Examiner

U.S. Cl. X.R.

72—405